United States Patent
MacLaren

(10) Patent No.: US 6,318,705 B1
(45) Date of Patent: Nov. 20, 2001

(54) ASPIRATOR

(75) Inventor: David S. MacLaren, Mayfield, OH (US)

(73) Assignee: JET, Inc., Cleveland, OH (US)

(*) Notice: Subject to any disclaimer, the term of this patent is extended or adjusted under 35 U.S.C. 154(b) by 0 days.

(21) Appl. No.: 09/483,397

(22) Filed: Jan. 14, 2000

(51) Int. Cl.$^7$ ................... B01F 3/04; C02F 3/02
(52) U.S. Cl. ........... 261/87; 261/93; 261/DIG. 71; 210/628
(58) Field of Search .................. 261/87, 91, 93, 261/DIG. 71; 210/220, 620, 628, 629

(56) References Cited

U.S. PATENT DOCUMENTS

| | | |
|---|---|---|
| 1,380,970 | 6/1921 | Meredith-Jones . |
| 3,776,531 | 12/1973 | Ebner et al. .................. 261/87 |
| 3,779,531 | 12/1973 | White .................. 261/87 |
| 4,505,813 * | 3/1985 | Graves .................. 261/87 |
| 4,925,598 * | 5/1990 | Kivisto et al. .................. 261/87 |
| 5,318,360 | 6/1994 | Langer et al. .................. 366/317 |
| 5,389,310 * | 2/1995 | Leiponen .................. 261/87 |
| 5,599,452 | 2/1997 | MacLaren et al. .................. 210/615 |
| 5,660,766 * | 8/1997 | Van Dyk .................. 261/87 |
| 5,795,504 * | 8/1998 | Berchotteau .................. 261/87 |

FOREIGN PATENT DOCUMENTS

| | | |
|---|---|---|
| 52-028058 | 3/1977 | (JP) . |
| 63-028432 | 2/1988 | (JP) . |
| 1315391 A1 | 7/1987 | (SU) . |

\* cited by examiner

Primary Examiner—C. Scott Bushey

(57) ABSTRACT

The aspirator is utilized to introduce air, oxygen, or other gases into a liquid. The advantages of the present design include the ability to inject approximately 30% more air than a conventional current design at 50% of the rotational speed. This reduces the power requirements. Additionally, the 45 degree angle of the aspirator tubes helps to shed debris that might otherwise collect on the aspirator. The aspirator design includes a fin along the aspirator tube, which is formed at a 45 degree angle relative to the aspirator shaft. Superior mixing is provided by the larger profile of the aspirator. The fins along the bottom of the aspirator tubes help to create larger voids in the liquid. This increases the aspirator's capacity to inject air, while minimizing the material requirements of the part.

6 Claims, 3 Drawing Sheets

ASPIRATOR

FIELD OF THE INVENTION

The present invention relates generally to an aspirator. In particular, the present invention is directed toward an aspirator used for sewage and wastewater treatment that has reduced power requirements by using a plurality of debris-shedding, finned aspirator tubes to inject approximately 30% more air than conventional designs at 50% of the rotational speed.

BACKGROUND

Commonly assigned U.S. Pat. No. 5,599,452 to MacLaren et al. discloses a wastewater treatment method which uses a conventional aspirator design.

U.S. Pat. No. 3,776,531 to Ebner, et al. discloses an apparatus with separate propeller blades and aspirator tubes for dispersing and entraining a fluid, particularly a gas, in a liquid. The reference teaches that the aspirator tubes should be at an angle between 35 degrees and 75 degrees, when compared to the vertical axis of the shaft.

U.S. Pat. No. 5,318,360 to Langer, et al. discloses a gas dispersion stirrer comprising a rotatable shaft and at least one hollow, disk-shaped stirring/aspirating member. This reference teaches the inclusion of flow-inducing blades on both the top side and the bottom side of the disk-shaped member.

The Soviet Union patent SU 1,315,391 shows the utilization of swirlers 13 on the outer edges of the hollow vanes 5.

U.S. Pat. No. 3,779,531 to White shows some aeration tubes that are utilized at a downward angle compared to the vertical shaft.

The Japanese patent JP 63-028432 shows inclined aeration tubes in FIGS. 1 and 3.

U.S. Pat. No. 1,380,970 to Meridith-Jones shows the utilization of rods to break up liquid.

U.S. Pat. No. 1,124,855 to Callow, et al. shows angled aeration tubes 13 in FIG. 1.

SUMMARY OF THE INVENTION

The aspirator design includes a fin along the aspirator tube, which is formed at a 45 degree angle relative to the aspirator shaft. The aspirator is utilized to introduce air into a liquid. The advantages of the present design include the ability to inject approximately 30% more air than your conventional current design at 50% of the rotational speed. This reduces the power requirements. Additionally, the 45 degree angle of the aspirator tubes helps to shed debris that might otherwise collect on the aspirator. Superior mixing is provided by the larger profile of the aspirator. The fins along the bottom of the aspirator tubes help to create larger voids in the liquid. This increases the aspirator's capacity to inject air, while minimizing the material requirements of the part.

DETAILED DESCRIPTION OF THE INVENTION

Figure 1:
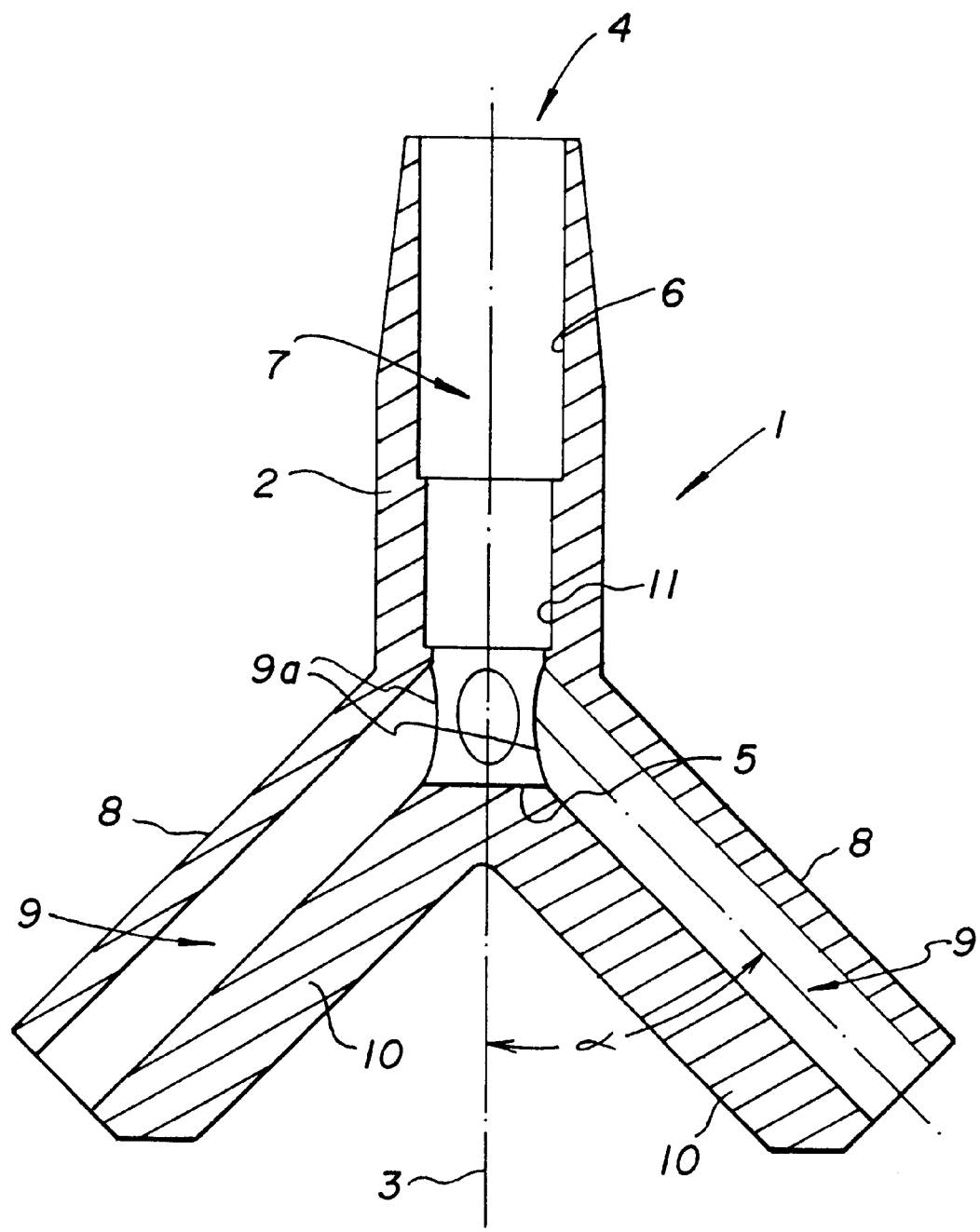
FIG. 1 illustrates a cross sectional view of the aspirator of the present invention.

FIG. 1 illustrates a cross sectional view of the aspirator 1. The aspirator 1 includes a generally cylindrical main body 2 having a central axis 3, an open first end 4, and closed second end 5, and a inner wall 6 defining a hollow interior 7. A plurality of straight, equally-spaced aspirator tubes 8 extend radially from the second end 5 of the main body 2 at an angle α of approximately 45° from the central axis 3 in a direction opposite from the first end 4. In the preferred embodiment, four aspirator tubes 8 are employed.

The aspirator tubes 8 include open-ended conduits 9 in communication at one end 9a with the hollow interior 7. Each aspirator tube 8 further includes a planar fin portion 10 extending from a side opposite the first end 4 of the main body 2. The fins 10 extend in a direction parallel to the central axis 3.

A portion of the inner wall 7 can include internal threading 11 for engaging mating threads of a hollow aerator shaft. Use of left-hand threading is preferred so that the rotation of the shaft by typical motors will serve to tighten the connection.

Figure 2:
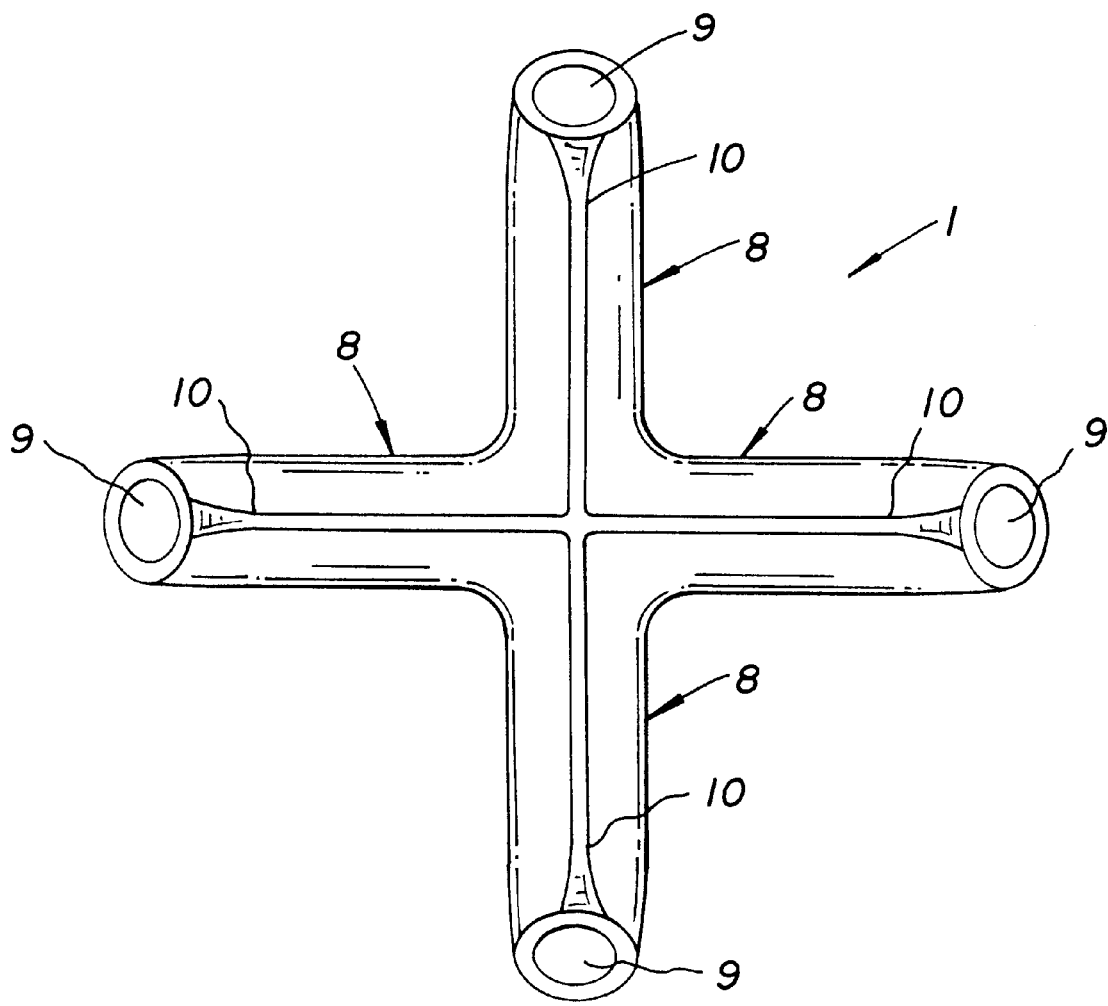
FIG. 2 illustrates a bottom view of the aspirator of the present invention.
Figure 3:
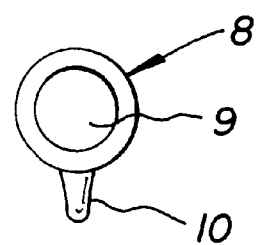
FIG. 3 illustrates an end view of the aspirator tubes of the present invention.

FIG. 2 shows a bottom view of the aspirator 1 showing the equal spacing of aspirator tubes 8 and the planar and parallel properties of fins 10, as discussed above. FIG. 3 shows an end view of an aspirator tube 8 and the relationship with its fin 10.

When an aerator shaft rotates the aspirator 1 in a liquid, the low pressure formed behind the fins 10 causes cavitation wherein voids, pockets of vapor formed due to the low pressure, are formed. These cavitation voids collapse rapidly, causing agitation which breaks up any agglomerated material in the liquid and mechanically reduces particle size. As stated in U.S. Pat. No. 5,599,452, which is incorporated herein by reference, this reduction in particle size is useful for enhancing wastewater treatment.

The locally formed low pressure region adjacent the rotating aspirator 1 additionally draws fluid from the hollow interior 7 through the aspirator tubes 8 and into the liquid. When used for wastewater treatment, the fluid can be air or oxygen. This is also useful for enhancing wastewater treatment, as disclosed in U.S. Pat. No. 5,599,452.

When compared to the aspirator of U.S. Pat. No. 5,599,452, which rotates at 3450 RPM, the present invention can aspirate 30% more air at 50% of the rotational speed (1725 RPM) to produce enhanced wastewater treatment with reduced power requirements.

Figure 4:
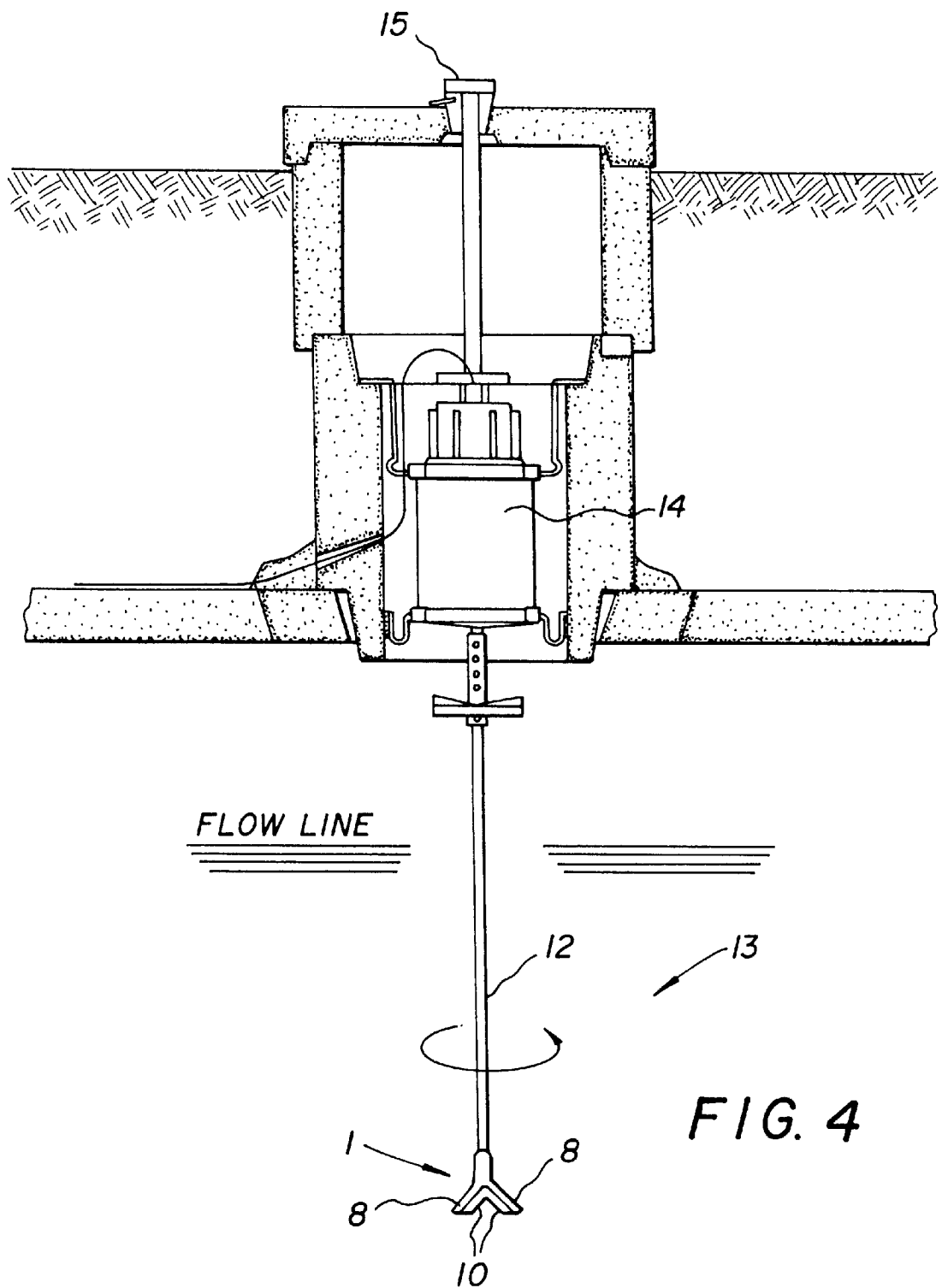
FIG. 4 illustrates a typical embodiment for practicing the method of the present invention.

FIG. 4 illustrates an arrangement for using the aspirator 1 for wastewater treatment. The aspirator 1 is rigidly mounted on a hollow aerator shaft 12 and inserted into the wastewater 13. Motor 14 rotates the shaft 12 and the low pressure formed adjacent the rotating aspirator 1 causes air to be drawn in from aperture 15, through hollow aerator shaft 12, into the hollow interior 7 of aspirator 1, and through aspirator tubes 8 into the wastewater 13. In this vertical position, the 45° of the aspirator tubes 8 relative to the central axis 3 helps shed debris that might otherwise collect on the aspirator 1.

In a preferred embodiment of the invention, the aspirator 1 is formed of Nylon 6—6 with 13% fiberglass fill, red. The balance of the aspirator 1 should be held to a maximum of 0.01 inch-ounce. The tips of the aspirator tubes 8 should be equally and accurately spaced so as to track in the same plane within 0.010 T.I.R. to the central axis 3.

Preferred and alternate embodiments of the present invention have now been described in detail. It is to be noted, however, that these embodiments are merely illustrative of the principles underlying the inventive concept of the present invention. It is therefore contemplated that various modifications of the disclosed embodiments will be apparent to persons of ordinary skill in the art, without departing from the scope of the present invention. For example, fluids other than air, as well as liquids other than wastewater, may be employed with the apparatus and method of the present invention.

I claim:

1. An aspirator comprising:
   a main body having a central axis, an open first end, a closed second end, and a inner wall defining a hollow interior; and
   a plurality of straight, equally-spaced aspirator tubes radially extending from said second end of said main body at a 45° angle from said central axis in a direction opposite from said first end,
   wherein said aspirator tubes include open-ended conduits in communication at one end with said hollow interior, and
   wherein each aspirator tube further includes a planar fin portion extending from a side opposite said first end of said main body and extending in a direction parallel to said central axis.

2. The aspirator of claim 1, wherein said plurality of aspirator tubes comprises four aspirator tubes.

3. The aspirator of claim 1, wherein said main body is substantially cylindrical.

4. The aspirator of claim 3, further comprising internal threads on said inner wall for engaging a hollow shaft having external threads.

5. The aspirator of claim 4, wherein said internal threads are left-handed.

6. A method of aspirating wastewater, comprising:
   inserting a portion of a hollow shaft with the aspirator of claim 1 mounted thereon into a volume of wastewater; and
   rotating said hollow shaft at a speed sufficient to cause the fins on the aspirator to produce cavitation voids.

* * * * *